United States Patent
Akita et al.

(10) Patent No.: US 11,031,807 B2
(45) Date of Patent: Jun. 8, 2021

(54) POWER SUPPLY DEVICE AND POWER SUPPLY SYSTEM

(71) Applicant: Sumitomo Electric Industries, Ltd., Osaka (JP)

(72) Inventors: Tetsuo Akita, Osaka (JP); Naoki Ayai, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 40 days.

(21) Appl. No.: 16/313,698

(22) PCT Filed: Jun. 7, 2017

(86) PCT No.: PCT/JP2017/021197
§ 371 (c)(1),
(2) Date: Dec. 27, 2018

(87) PCT Pub. No.: WO2018/012155
PCT Pub. Date: Jan. 18, 2018

(65) Prior Publication Data
US 2019/0237995 A1 Aug. 1, 2019

(30) Foreign Application Priority Data
Jul. 15, 2016 (JP) .............................. JP2016-140408

(51) Int. Cl.
*H04Q 9/08* (2006.01)
*H02J 3/14* (2006.01)
(Continued)

(52) U.S. Cl.
CPC .......... *H02J 9/062* (2013.01); *H01M 10/425* (2013.01); *H01M 10/44* (2013.01); *H01M 10/48* (2013.01);
(Continued)

(58) Field of Classification Search
CPC ...... H02J 9/06; H02J 3/38; H02J 3/383; H02J 9/062; H02J 7/35; H02J 7/022;
(Continued)

(56) References Cited

U.S. PATENT DOCUMENTS

2009/0302691 A1* 12/2009 Wang ........................ H02J 3/38
307/129
2011/0062786 A1* 3/2011 Rozman .................. H02J 3/387
307/82
(Continued)

FOREIGN PATENT DOCUMENTS

| JP | 2000-092720 A | 3/2000 |
|---|---|---|
| JP | 2008-043144 A | 2/2008 |
| WO | 2013/128986 A1 | 9/2013 |

*Primary Examiner* — Jared Fureman
*Assistant Examiner* — Esayas G Yeshaw
(74) *Attorney, Agent, or Firm* — Baker Botts L.L.P.; Michael A. Sartori

(57) ABSTRACT

This power supply device includes: a power interconnection path connecting a power interconnection port to a power conversion unit via a first switch; a stand-alone power supply path leading from an auxiliary input port via a second switch to an output port to which a load is connected; a storage-battery-side power supply path leading from a storage battery via the power conversion unit to the output port; and a control unit, the control unit causing the power conversion unit to charge/discharge the storage battery when interconnected with a commercial power grid, the control unit supplying power to the load via one of the stand-alone power supply path and the storage-battery-side power supply path when disconnected from the commercial power grid, the control unit switching the power supply path from the one to the other within an extremely short time period such as not to influence the load.

7 Claims, 5 Drawing Sheets

(51) Int. Cl.
   *H02J 9/06*      (2006.01)
   *H02J 3/38*      (2006.01)
   *H02J 7/35*      (2006.01)
   *H01M 10/48*     (2006.01)
   *H01M 10/42*     (2006.01)
   *H01M 10/44*     (2006.01)
   *H02J 7/02*      (2016.01)
   *H02M 7/68*      (2006.01)

(52) U.S. Cl.
   CPC ............... *H02J 3/38* (2013.01); *H02J 7/022* (2013.01); *H02J 7/35* (2013.01); *H02J 9/06* (2013.01); *H02M 7/68* (2013.01); *H01M 2220/10* (2013.01); *Y02B 10/70* (2013.01)

(58) Field of Classification Search
   CPC .. H02M 7/68; H01M 10/425; H01M 2220/10; H01M 10/44; H01M 10/48; Y02B 10/72
   See application file for complete search history.

(56) References Cited

U.S. PATENT DOCUMENTS

| | | | |
|---|---|---|---|
| 2011/0133558 A1* | 6/2011 | Park | H02J 3/005 307/66 |
| 2011/0148205 A1* | 6/2011 | Moon | H02J 9/062 307/65 |
| 2013/0257383 A1* | 10/2013 | Shim | H02J 7/0021 320/134 |
| 2014/0361725 A1 | 12/2014 | Nishikawa et al. | |
| 2015/0188361 A1* | 7/2015 | Zhang | H02J 9/062 307/66 |
| 2018/0041824 A1* | 2/2018 | Kakuda | H02J 13/00 |
| 2019/0237980 A1* | 8/2019 | Yang | H01M 2/10 |

\* cited by examiner

POWER SUPPLY DEVICE AND POWER SUPPLY SYSTEM

TECHNICAL FIELD

The present invention relates to a power supply device and a power supply system. This application claims priority on Japanese Patent Application No. 2016-140408 filed on Jul. 15, 2016, the entire contents of which are incorporated herein by reference.

BACKGROUND ART

An uninterruptible power supply (UPS) is a power supply unit that, normally, charges a storage battery with a power from a commercial power grid, and upon power outage, converts the power stored in the storage battery to an AC power and outputs the AC power to a load. For charging and discharging of the storage battery, a circuit configuration having a bidirectional inverter can be used (see, for example, Patent Literature 1).

In recent years, an increased number of stand-alone outputs of power conditioners connected to, for example, a photovoltaic panel, have been able to be used as power supplies at the time of power outage. At the time of power outage, the uninterruptible power supply can also be used with connection switched to an outlet for stand-alone output.

CITATION LIST

Patent Literature

PATENT LITERATURE 1: Japanese Laid-Open Patent Publication No. 2008-43144

SUMMARY OF INVENTION

One expression of a power supply device of the present invention is a power supply device including: a power interconnection port connected to a commercial power grid; an auxiliary input port connected to a stand-alone output terminal of a distributed power supply; an output port connected to a load; a storage battery; a power conversion unit connected to the storage battery and configured to perform charging/discharging of the storage battery through DC/AC bidirectional conversion; a power interconnection path connecting the power interconnection port to the power conversion unit via a first switch; a stand-alone power supply path leading from the auxiliary input port via a second switch to the output port; a storage-battery-side power supply path leading from the storage battery via the power conversion unit to the output port; and a control unit configured to, in a case of being interconnected with the commercial power grid, cause the power conversion unit to perform charging/discharging of the storage battery, and in a case of being disconnected from the commercial power grid, supply a power to the load via one of the stand-alone power supply path and the storage-battery-side power supply path, and at a time of switching the power supply path to the other one, switch the power supply path within an extremely short time period such as not to influence the load.

It is noted that "an extremely short time period such as not to influence the load" not only includes an ideally complete uninterruptible case, but also means that the time period is within an extremely short time period (for example, 10 milliseconds) such as not to influence a majority of loads even though, strictly speaking, momentary power interruption may occur.

One expression of a power supply system of the present invention is a power supply system including: a photovoltaic panel; a power conditioner connected to the photovoltaic panel, and having a function of performing power interconnection with a commercial power grid and a function of providing stand-alone output; and a power supply device having a storage battery. The power supply device includes: a power interconnection port connected to the commercial power grid; an auxiliary input port connected to a stand-alone output terminal of the power conditioner; an output port connected to a load; a power conversion unit connected to the storage battery and configured to perform charging/discharging of the storage battery through DC/AC bidirectional conversion; a power interconnection path connecting the power interconnection port to the power conversion unit via a first switch; a stand-alone power supply path leading from the auxiliary input port via a second switch to the output port; a storage-battery-side power supply path leading from the storage battery via the power conversion unit to the output port; and a control unit configured to, in a case of being interconnected with the commercial power grid, cause the power conversion unit to perform charging/discharging of the storage battery, and in a case of being disconnected from the commercial power grid, supply a power to the load via one of the stand-alone power supply path and the storage-battery-side power supply path, and at a time of switching the power supply path to the other one, switch the power supply path within an extremely short time period such as not to influence the load.

DESCRIPTION OF EMBODIMENTS

Figure 1:
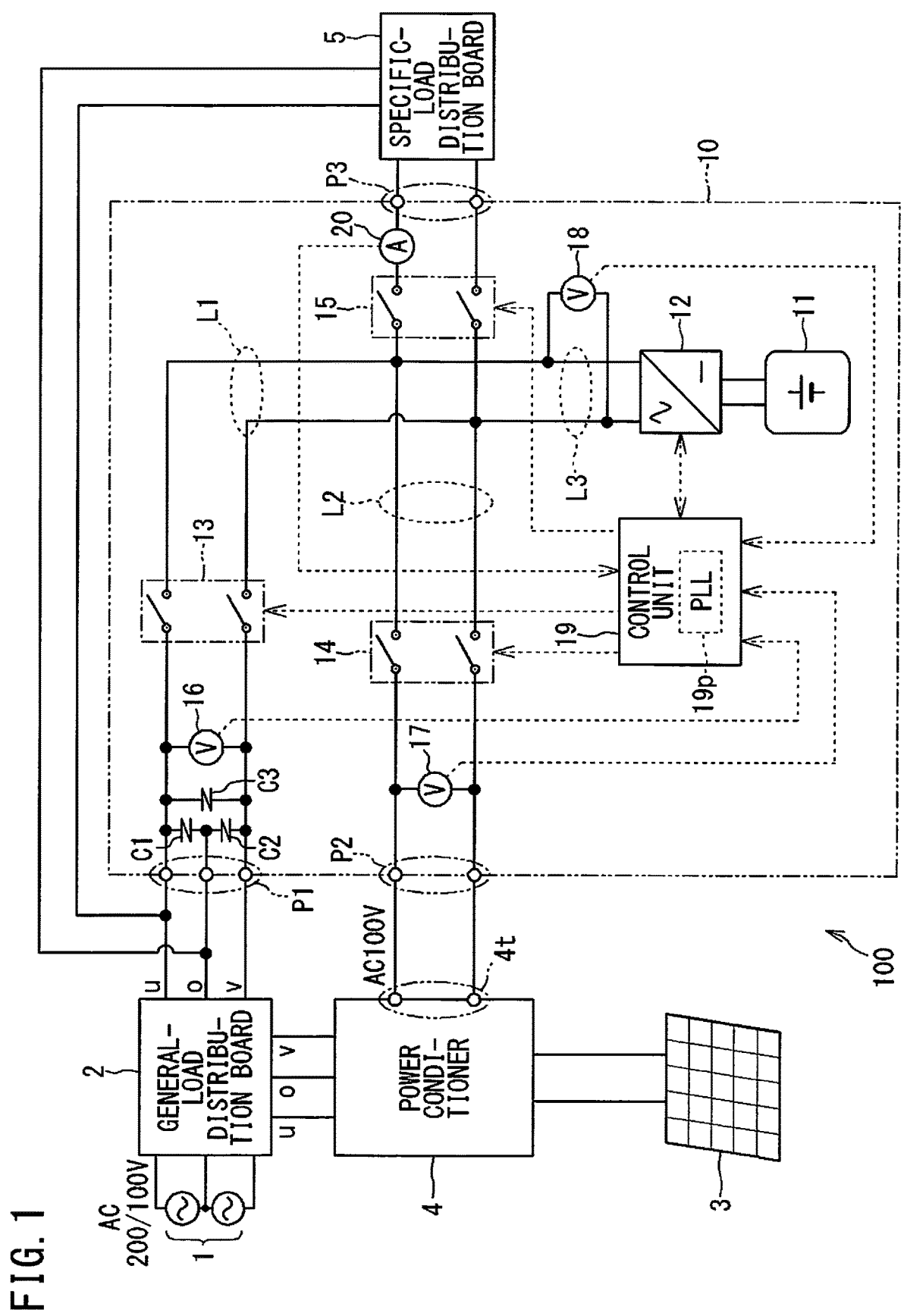
FIG. 1 is a connection diagram of a power supply device and a power supply system including the same, in one consumer.

Problems to be Solved by the Present Disclosure

If an uninterruptible power supply is used only for the purpose of merely serving as a backup power supply upon power outage, a storage battery is to continue standing by over a long time period in a full-charge state. In a case where the storage battery is a lithium ion battery, the cost thereof is higher than a lead storage battery. Also considering that the storage battery is such an expensive storage battery, usage only at the time of power outage is far from sufficient utilization. In addition, in a case where the storage battery is a lithium ion battery, standby during a long time period in a full-charge state leads to shortening of the life thereof.

On the other hand, if stand-alone output of a power conditioner is not actively used by a user, a power that could be generated is not utilized. Accordingly, it is necessary to expand the effective utilization range of the storage battery by devising the way of combination of the storage battery and the power conditioner.

Considering the above problem, an object of the present disclosure is to provide a power supply device that enables expansion of the effective utilization range of a storage battery for a consumer, and a power supply system including the power supply device.

Effects of the Present Disclosure

The power supply device and the power supply system of the present disclosure enable expansion of the effective utilization range of a storage battery for a consumer.

Summary of Embodiments

Summary of the embodiments of the present invention includes at least the following.

(1) This power supply device includes: a power interconnection port connected to a commercial power grid; an auxiliary input port connected to a stand-alone output terminal of a distributed power supply; an output port connected to a load; a storage battery; a power conversion unit connected to the storage battery and configured to perform charging/discharging of the storage battery through DC/AC bidirectional conversion; a power interconnection path connecting the power interconnection port to the power conversion unit via a first switch; a stand-alone power supply path leading from the auxiliary input port via a second switch to the output port; a storage-battery-side power supply path leading from the storage battery via the power conversion unit to the output port; and a control unit configured to, in a case of being interconnected with the commercial power grid, cause the power conversion unit to perform charging/discharging of the storage battery, and in a case of being disconnected from the commercial power grid, supply a power to the load via one of the stand-alone power supply path and the storage-battery-side power supply path, and at a time of switching the power supply path to the other one, switch the power supply path within an extremely short time period such as not to influence the load.

The power supply device as described above functions as a power-interconnection-type storage battery which causes the power conversion unit to perform charging/discharging of the storage battery, in a case of interconnecting with the commercial power grid. In a case of being disconnected from the commercial power grid due to power outage of the commercial power grid, the power supply device supplies a power to the load via one of the stand-alone power supply path and the storage-battery-side power supply path, and in a disconnected state, at the time of switching the power supply path to the other one, the power supply device performs the switching within an extremely short time period such as not to influence the load, thus serving as a backup power supply that is uninterruptible for the load.

It is noted that the power supply device that is being interconnected with the commercial power grid is subjected to constraints of the power interconnection rule and therefore cannot perform switching without power interruption. However, the power supply device that is disconnected from the commercial power grid is an independent power supply device that is not subjected to constraints of the power interconnection rule. Therefore, the power supply device in this state can perform switching between power supply to the load via the stand-alone power supply path and power supply to the load via the storage-battery-side power supply path, without power interruption. Thus, even in a case where the distributed power supply has a possibility that power generation is temporarily stopped because of the weather as in photovoltaic generation, for example, it is possible to stably supply a power through uninterruptible switching. That is, when the commercial power grid is normal, the power supply device contributes to power supply as a power-interconnection-type storage battery, and upon power outage, the power supply device serves as an uninterruptible power supply for backing up the stand-alone output of the distributed power supply. Thus, the storage battery can be always effectively utilized.

(2) The power supply device of (1) may further include: an input voltage sensor configured to detect a voltage at the auxiliary input port and report the voltage to the control unit; and a conversion unit voltage sensor configured to detect a voltage at an AC-side end of the power conversion unit and report the voltage to the control unit, wherein both of the first switch and the second switch may be relay contacts, and in shifting from a storage battery discharge mode in which a power is supplied to the load via the storage-battery-side power supply path to a stand-alone output mode in which a power is supplied to the load via the stand-alone power supply path, the control unit may cause an output voltage of the power conversion unit and a voltage of the auxiliary input port to be matched with each other in voltage level and to be synchronized with each other in phase, and thereafter, may output a signal for closing the second switch and keep the storage battery discharge mode during a predetermined time period until the second switch is expected to be actually closed, and when the predetermined time period has elapsed, the control unit may switch the storage battery discharge mode to the stand-alone output mode.

In the power supply device configured as described in the above (2), a predetermined time period is required for closing of the second switch which is a relay contact. Accordingly, after a signal for closing the second switch is outputted, the storage battery discharge mode is kept during a predetermined time period until the second switch is expected to be actually closed, and when the predetermined time period has elapsed, the storage battery discharge mode is switched to the stand-alone output mode. The output voltage of the power conversion unit and the voltage of the auxiliary input port are matched with each other in voltage level and synchronized with each other in phase, whereby the voltage can be prevented from becoming discontinuous at the time of switching.

(3) In the power supply device of (2), preferably, the control unit outputs the signal for closing the second switch so that a timing at which the second switch having received the signal is actually closed is at or near a zero cross point of a voltage phase.

In this case, a current that starts to flow through the second switch at the same time as the closing can be suppressed, and thus consumption of the relay contact can be suppressed.

(4) The power supply device of (2) or (3) may further include a current sensor configured to detect a current flowing through the output port and send a detection output thereof to the control unit, wherein the control unit may charge the storage battery with a surplus power of stand-alone output of the distributed power supply on the basis of the detection output of the current sensor in the stand-alone output mode.

In this case, a surplus power of the stand-alone output beyond power consumption can be stored into the storage battery without any loss.

(5) A system including the power supply device of (1) is a power supply system including: a photovoltaic panel; a power conditioner connected to the photovoltaic panel, and having a function of performing power interconnection with a commercial power grid and a function of providing stand-alone output; and a power supply device having a storage battery. The power supply device includes: a power interconnection port connected to the commercial power grid; an auxiliary input port connected to a stand-alone output terminal of the power conditioner; an output port connected to a load; a power conversion unit connected to the storage battery and configured to perform charging/discharging of the storage battery through DC/AC bidirectional conversion; a power interconnection path connecting the power interconnection port to the power conversion unit via a first switch; a stand-alone power supply path leading from the auxiliary input port via a second switch to the output port; a storage-battery-side power supply path leading from the storage battery via the power conversion unit to the output port; and a control unit configured to, in a case of being interconnected with the commercial power grid, cause the power conversion unit to perform charging/discharging of the storage battery, and in a case of being disconnected from the commercial power grid, supply a power to the load via one of the stand-alone power supply path and the storage-battery-side power supply path, and at a time of switching the power supply path to the other one, switch the power supply path within an extremely short time period such as not to influence the load.

The power conditioner in the power supply system configured as described above contributes to power supply through power interconnection when the commercial power grid is normal, and provides stand-alone output to the power supply device upon power outage.

In addition, when the commercial power grid is normal, the power supply device contributes to power supply for a consumer, as a power-interconnection-type storage battery. In addition, in a case of being disconnected from the commercial power grid due to power outage of the commercial power grid, the power supply device supplies a power to the load via one of the stand-alone power supply path and the storage-battery-side power supply path, and at the time of switching the power supply path to the other one, the power supply device performs the switching within an extremely short time period such as not to influence the load, thus serving as a backup power supply that is uninterruptible for the load.

It is noted that the power supply device that is being interconnected with the commercial power grid is subjected to constraints of the power interconnection rule and therefore cannot perform switching without power interruption. However, the power supply device that is disconnected from the commercial power grid is an independent power supply device that is not subjected to constraints of the power interconnection rule. Therefore, the power supply device in this state can perform switching between power supply to the load via the stand-alone power supply path and power supply to the load via the storage-battery-side power supply path, without power interruption. Thus, even in a case where the distributed power supply has a possibility that power generation is temporarily stopped because of the weather as in photovoltaic generation, for example, it is possible to stably supply a power through uninterruptible switching. That is, when the commercial power grid is normal, the power supply device contributes to power supply as a power-interconnection-type storage battery, and upon power outage, the power supply device serves as an uninterruptible power supply for backing up the stand-alone output of the distributed power supply. Thus, the storage battery can be always effectively utilized.

Further, the power supply system makes it possible to provide a system configuration in which both of the power conditioner and the power supply device are always effectively utilized when the commercial power grid is normal and when power outage occurs.

(6) The power supply device can also be expressed as follows.

That is, the power supply device includes: a power interconnection port connected to a commercial power grid; an auxiliary input port connected to a stand-alone output terminal of a distributed power supply; an output port connected to a load; a storage battery; a power conversion unit connected to the storage battery and configured to perform charging/discharging of the storage battery through DC/AC bidirectional conversion; a power interconnection path connecting the power interconnection port to the power conversion unit via a first switch; a stand-alone power supply path leading from the auxiliary input port via a second switch to the output port; a storage-battery-side power supply path leading from the storage battery via the power conversion unit to the output port; and a control unit configured to control the power conversion unit, and the first switch and the second switch, wherein (a) in a case of interconnecting with the commercial power grid, the control unit closes the first switch and opens the second switch, and causes the power conversion unit to perform charging/discharging of the storage battery, (b) in a case of performing disconnection from the commercial power grid, the control unit stands by during a predetermined time period in a state in which the first switch is opened and the second switch is also opened, and thereafter, supplies a power to the load via one of the stand-alone power supply path and the storage-battery-side power supply path, and (c) in a state of being disconnected from the commercial power grid, when power supply to the load is to be switched from one of the stand-alone power supply path and the storage-battery-side power supply path to the other one, the control unit performs the switching substantially without power interruption.

The power supply device as described above functions as a power-interconnection-type storage battery which causes the power conversion unit to perform charging/discharging of the storage battery in a case of interconnecting with the commercial power grid. In a case of performing disconnection from the commercial power grid due to power outage of the commercial power grid, the power supply device stands by during a predetermined time period (settling time), and thereafter, supplies a power to the load via one of the stand-alone power supply path and the storage-battery-side power supply path. Then, in a state of being disconnected from the commercial power grid, when power supply to the load is to be switched from one of the stand-alone power supply path and the storage-battery-side power supply path to the other one, the power supply device performs the switching substantially without power interruption (for example, within 10 milliseconds), thus serving as a backup power supply that is uninterruptible for the load.

It is noted that the power supply device that is being interconnected with the commercial power grid is subjected to constraints of the power interconnection rule and therefore cannot perform switching without power interruption. However, the power supply device that is disconnected from the commercial power grid is an independent power supply device that is not subjected to constraints of the power interconnection rule. Therefore, the power supply device in this state can perform switching between power supply to the load via the stand-alone power supply path and power supply to the load via the storage-battery-side power supply path, without power interruption. Thus, even in a case where the distributed power supply has a possibility that power generation is temporarily stopped because of the weather as in photovoltaic generation, for example, it is possible to stably supply a power through uninterruptible switching. That is, when the commercial power grid is normal, the power supply device contributes to power supply as a power-interconnection-type storage battery, and upon power outage, the power supply device serves as an uninterruptible power supply for backing up the stand-alone output of the distributed power supply. Thus, the storage battery can be always effectively utilized.

Details of Embodiments

Hereinafter, a power supply device and a power supply system according to one embodiment of the present invention will be described with reference to the drawings.

Configurations of Power Supply Device and Power Supply System

FIG. 1 is a connection diagram of a power supply device 10 and a power supply system 100 including the same, in one consumer. In FIG. 1, a commercial power grid 1 of single-phase three-wire type is connected to a general-load distribution board 2. A power conditioner 4 is connected to a photovoltaic panel 3. Further, the power conditioner 4 is connected to the general-load distribution board 2 via three lines (u, o, v) and thus interconnected with the commercial power grid 1.

The power supply device 10 has an input/output port and an input port. A power interconnection port P1 on the upper left side in FIG. 1 is the input/output port, and is connected to the commercial power grid 1 via the general-load distribution board 2. The power interconnection port P1 is connected to the three lines u, o, v of single-phase three-wire type via the general-load distribution board 2, for example. In the power supply device 10, for example, varistors C1, C2, C3 are provided. The varistor C1 is provided between the lines u and o, the varistor C2 is provided between the lines v and o, and the varistor C3 is provided between the lines u and v.

An auxiliary input port P2 on the lower left side in FIG. 1 is connected to a stand-alone output terminal 4t of the power conditioner 4. The stand-alone output terminal 4t outputs a voltage of, for example, AC 100 V.

The power supply device 10 has one output port P3. A specific-load distribution board 5 is connected to the output port P3. A specific load (not shown) which is desired to be used also during power outage is connected to the specific-load distribution board 5. The specific-load distribution board 5 receives input of AC 100 V from between, for example, the voltage line u and the neutral line o of the general-load distribution board 2. The specific-load distribution board 5 has a switch function so as to allow selection of one of a voltage provided from the general-load distribution board 2 and a voltage (AC 100 V) provided from the power supply device 10.

The power supply device 10 includes: a storage battery 11 which is, for example, a lithium ion battery; a bidirectional inverter 12 as a power conversion unit connected to the storage battery 11; three switches 13, 14, 15; three voltage sensors 16, 17, 18; a current sensor 20 provided to one of electric paths leading to the output port P3; and a control unit 19 for controlling the bidirectional inverter 12 and the switches 13, 14, 15. The switches 13, 14, 15 are relay contacts which are controlled to be opened/closed by the control unit 19. The voltage sensors 16 and 17 respectively detect a voltage (AC 200 V) of the power interconnection port P1 and an input voltage (AC 100 V) of the auxiliary input port P2. The voltage sensor 18 detects a voltage outputted to the switch 15. Detection outputs from the voltage sensors 16, 17, 18 are sent to the control unit 19. The current sensor 20 detects a current flowing through the output port P3, and detection output thereof is sent to the control unit 19.

The control unit 19 includes, for example, a microcomputer, and realizes necessary control functions by the microcomputer executing software (computer program). The software is stored in a storage device (not shown) of the control unit 19. It is noted that, the control unit can also be configured with a circuit formed from only hardware not including a microcomputer. In addition, the control unit 19 has a function of a phase locked loop (PLL) 19p.

In the power supply device 10, the following paths exist: a power interconnection path L1 connecting the power interconnection port P1 to the bidirectional inverter 12 via the switch 13; a stand-alone power supply path L2 leading from the auxiliary input port P2 via the switch 14 to the output port P3; and a storage-battery-side power supply path L3 leading from the storage battery 11 via the bidirectional inverter 12 to the output port P3. During power interconnection, the bidirectional inverter 12 operates so that the AC-side voltage becomes 200 V. When a power is supplied from the storage battery 11 to the output port P3, the bidirectional inverter 12 operates so that the AC-side voltage becomes 100 V.

Operations of Power Supply Device and Power Supply System

When the control unit 19 in the power supply device 10 detects by the voltage sensor 16 that a voltage which is normal (i.e., without power outage) is being inputted from the commercial power grid 1, the control unit 19 closes the switch 13 and opens the other switches 14, 15. By the switch 13 being closed, the general-load distribution board 2 and the bidirectional inverter 12 are connected to each other via the voltage lines u, v. In this state, if the bidirectional inverter 12 performs conversion operation from AC to DC, the storage battery 11 is charged. On the other hand, if the bidirectional inverter 12 causes the storage battery 11 to discharge and performs conversion operation from DC to AC, the storage battery 11 comes into a "power-interconnection storage battery" state and thus can supply power to a load (not shown), in the consumer, that is connected to the general-load distribution board 2. It is noted that reverse flow (power selling) to the commercial power grid 1 is not permitted by the power interconnection rule.

On the other hand, during the daytime, the photovoltaic panel 3 receives sunlight and generates a power. The generated power is converted to an AC voltage and an AC current that are synchronized with the commercial power grid, by the power conditioner 4, and then consumed by the load, in the consumer, which is connected to the general-load distribution board 2, while the surplus power is caused to reversely flow (sold) to the commercial power grid 1.

For example, a specific load (not shown) which is desired to be used also during power outage of the commercial power grid 1 is connected to the specific-load distribution board 5. The specific load connected to the specific-load distribution board 5 is normally supplied with a voltage (here, AC 100 V) sent from the commercial power grid 1 via the general-load distribution board 2.

Here, if power outage of the commercial power grid 1 occurs, the control unit 19 that has detected the power outage by the voltage sensor 16 opens the switch 13 to disconnect the power supply device 10 from the commercial power grid 1. According to the power interconnection rule, the other switches 14, 15 cannot be closed at the same time as opening of the switch 13, and it is necessary to stand by during a predetermined time period (settling time). On the other hand, also the power conditioner 4 detects the power outage and opens a switch (power interconnection relay) included therein, whereby the power conditioner 4 is disconnected from the commercial power grid 1. After the predetermined time period has elapsed, if photovoltaic generation can be performed, the power conditioner 4 can output a voltage (here, AC 100 V) to the stand-alone output terminal 4t.

Next, the outline of a series of operations of the power supply device 10 will be described with reference to a flowchart shown in FIG. 2. The main unit that executes the flowchart is the control unit 19.

Figure 2:
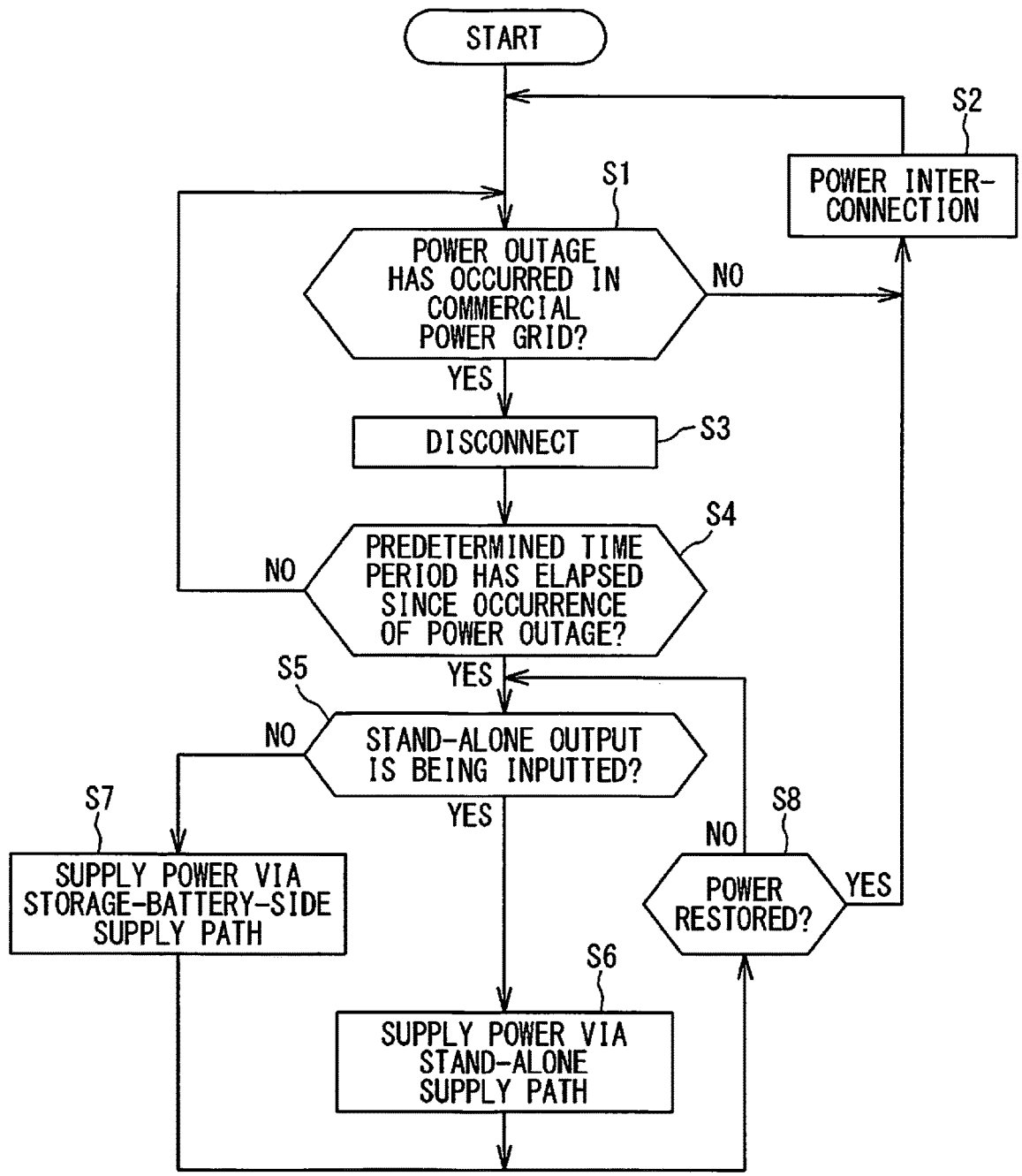
FIG. 2 is a flowchart showing the outline of a series of operations of the power supply device.

In FIG. 2, first, the control unit 19 determines whether or not power outage has occurred in the commercial power grid (step S1). As long as the commercial power grid is normal, power interconnection (step S2) is kept.

Upon power outage, the control unit 19 opens the switch 13 (the other switches 14, 15 have been already opened), to disconnect the power supply device 10 from the commercial power grid (step S3). Then, the control unit 19 waits until a predetermined time period elapses from occurrence of the power outage (step S4), and if the power is restored within this period, the process proceeds from step S1 to step S2, to return to power interconnection. On the other hand, if the predetermined time period has elapsed since occurrence of the power outage while the power outage continues, the control unit 19 determines whether or not stand-alone output is being inputted from the power conditioner 4 (step S5). If photovoltaic generation can be performed, stand-alone output is automatically (or manually) provided from the power conditioner 4 when the predetermined time period has elapsed since occurrence of the power outage. In this case, the control unit 19 closes the switches 14, 15 (the switch 13 remains opened) to supply power to the specific-load distribution board 5 via the stand-alone power supply path L2 (step S6).

At this time, the current sensor 20 is detecting a current flowing through the output port P3 and is sending the detection output thereof to the control unit 19. Accordingly, if the control unit 19 finds that there is a surplus power in the stand-alone output of the power conditioner 4 on the basis of the detection output, the control unit 19 can store the surplus power into the storage battery 11 by causing the bidirectional inverter 12 to operate in the charging direction. In this way, a surplus power of the stand-alone output beyond power consumption can be stored into the storage battery 11 without any loss.

On the other hand, if stand-alone output is not obtained ("No" in step S5), the control unit 19 closes only the switch 15 (the switches 13, 14 are opened), to supply a power to the specific-load distribution board 5 via the storage-battery-side power supply path L3 (step S7). The processing of steps S5 and S6 or steps S5 to S7 is continued until power restoration is confirmed (step S8).

Here, the power supply device 10 when disconnected from the commercial power grid in a power outage state is not subjected to constraints of the power interconnection rule. Therefore, in a case where power generation is stopped in the stand-alone output because of, for example, rapid change of solar radiation, so-called uninterruptible switching can be performed between the power supply paths. Specifically, it is possible to switch from power supply via the stand-alone power supply path L2 to power supply via the storage-battery-side power supply path L3 within an extremely short time period (e.g., within 10 milliseconds) such as not to influence the load. On the other hand, when the stand-alone output is restored by restart of power generation, it is possible to perform uninterruptible switching from power supply via the storage-battery-side power supply path L3 to power supply via the stand-alone power supply path L2.

Thereafter, if the control unit 19 confirms that the power of the commercial power grid is restored ("Yes" in step S8), the process returns to power interconnection (step S2). Subsequently, the same process is to be performed endlessly.

As described above, in a case where the power supply device 10 is being interconnected with the commercial power grid 1, the power supply device 10 functions as a power-interconnection-type storage battery which causes the bidirectional inverter 12 to perform charging/discharging of the storage battery 11. In a case where the power supply device 10 is disconnected from the commercial power grid 1 due to power outage of the commercial power grid 1, the power supply device 10 supplies a power to the load connected to the specific-load distribution board 5, via one of the stand-alone power supply path L2 and the storage-battery-side power supply path L3, and at the time of switching the power supply path to the other one, performs the switching within an extremely short time period such as not to influence the load, thus serving as a backup power supply that is uninterruptible for the load. Therefore, even in a case where there is a possibility that power generation is temporarily stopped because of the weather as in photovoltaic generation, it is possible to stably supply a power through uninterruptible switching.

That is, when the commercial power grid 1 is normal, the power supply device 10 contributes to power supply as a power-interconnection-type storage battery, and upon power outage, the power supply device 10 serves as an uninterruptible power supply for backing up the stand-alone output. Thus, the storage battery 11 can be always effectively utilized.

Operation of Switch in Case of Disconnection

Next, operation of the switch 14 in the power supply device 10 in a case of disconnection will be described in detail. Since the power supply device 10 is a device that performs power interconnection, as well as the switch 13 which is directly involved with power interconnection, the other switches 14, 15 which are not directly involved with power interconnection are also required to perform mechanical open/close operations. Therefore, as described above, relay contacts are used as the switches 14, 15. A relay has a longer operation period than a semiconductor switch. This is because a relay in which a relay contact is physically moved takes a reasonable time until the relay contact is actually closed from excitation of a coil. Therefore, at the time of switching from the storage-battery-side power supply path L3 to the stand-alone power supply path L2, if the control unit 19 performs stop of discharge output operation of the bidirectional inverter 12, and excitation of the switch 14 at the same time, a blank time in which a power is not supplied to the load arises in a period from the excitation to closing of the relay contact. If the blank time exceeds 10 milliseconds, many loads are to be influenced.

Accordingly, switch control for the power supply paths is performed in consideration of the operation period of the switch 14.

Figure 3:
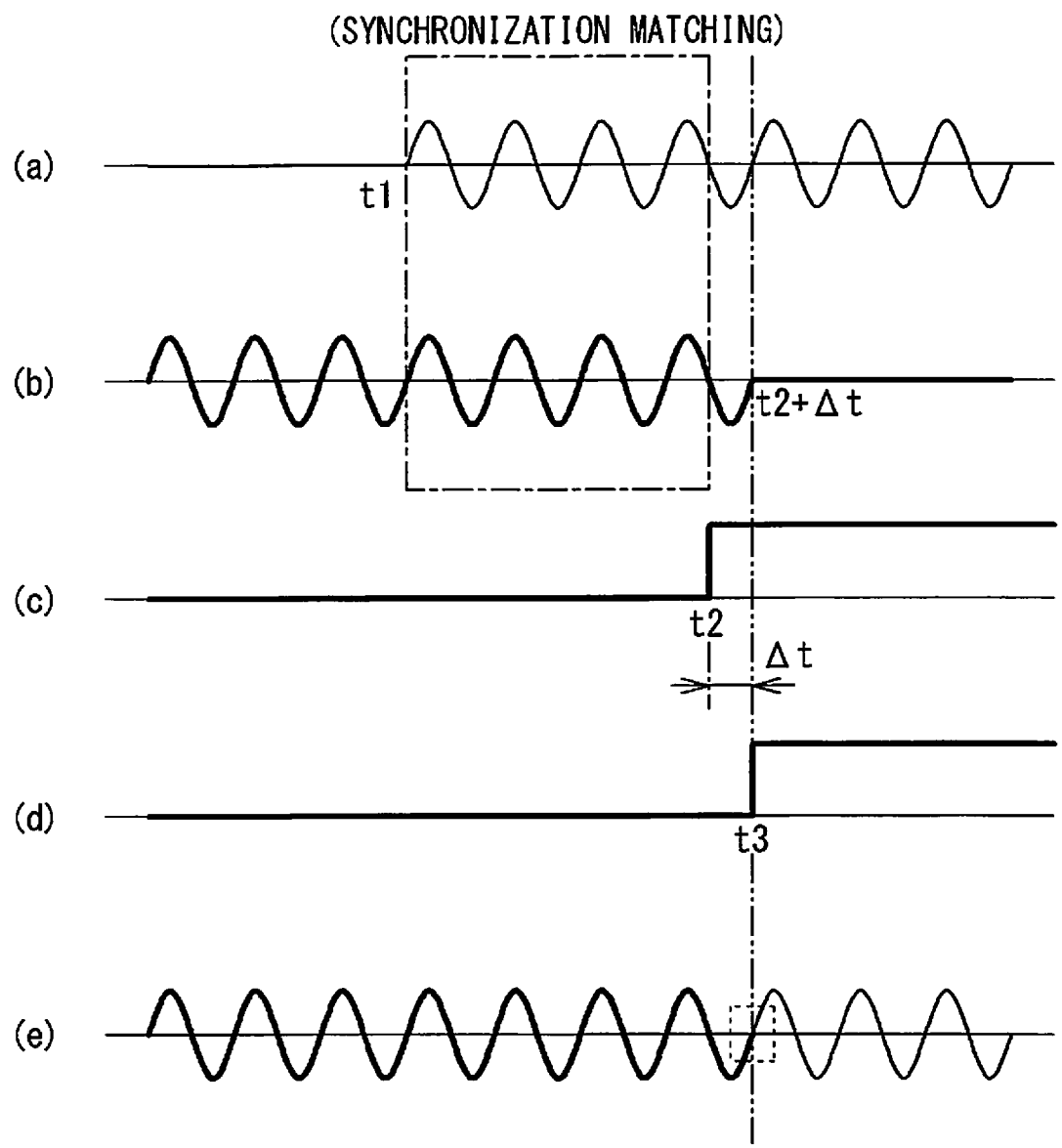
FIG. 3 is a waveform diagram relevant to control in switching from a storage-battery-side power supply path to a stand-alone power supply path.

FIG. 3 is a waveform diagram relevant to the control in switching from the storage-battery-side power supply path L3 to the stand-alone power supply path L2. In FIG. 3, (a) shows an example of the waveform of a stand-alone output voltage of the power conditioner 4 detected by the voltage sensor 17, (b) shows the waveform of an output voltage of the bidirectional inverter 12 detected by the voltage sensor 18 when the storage battery is discharged, (c) shows a closing signal (excitation signal) for the switch 14 (H level indicates ON of the closing signal, and L level indicates OFF), (d) shows operation of the relay contact of the switch 14 (H level indicates "closed", and L level indicates "opened"), and (e) shows the waveform of an output voltage outputted to the output terminal P3.

With reference to FIG. 3, from time t1 when stand-alone output of the power conditioner 4 is restored, the control unit 19 adjusts the output voltage and the phase of the bidirectional inverter 12 so as to match the voltage level with the stand-alone output and establish synchronization between both phases. Establishment of the synchronization is performed using the function of the phase locked loop 19p. At time t2 after establishment of the synchronization is confirmed, the control unit 19 outputs a closing signal (excitation signal) for the switch 14. However, at this point of time, discharge-direction output operation of the bidirectional inverter 12 is still not stopped. The stop is performed at time (t2+Δt). This Δt is the operation period (rated value) of the switch 14.

At time t3, the relay contact of the switch 14 is actually closed. If the operation period is equal to the rated value, the time t3 is represented as t3=(t2+Δt).

The control unit 19 determines the time t2 so that the AC voltages of (a) and (b) which are matched with each other in voltage level and synchronized with each other in phase come to zero cross points at the time (t2+Δt), considering that the operation period Δt is constant. That is, the time t2 is determined so that, if the switch 14 is closed with the operation period according to the rated value, the moment of the closing coincides with the zero cross timing.

Although the operation period Δt of the switch 14 might have slight error from the rated value, the operation period Δt is generally equal to the rated value or close thereto. Therefore, in the waveform of the output voltage shown in (e), although the voltage source is switched at time t3, both voltages to be switched therebetween are matched with each other in voltage level and synchronized with each other in phase, so that an AC voltage waveform that is generally smooth and continuous is obtained. In addition, since the switching timing is at or near a zero cross point, a current flowing through the switch 14 immediately after the switching can be suppressed.

As described above, in the power supply device 10, a predetermined time period is required for closing of the switch 14 which is a relay contact. Accordingly, after a signal for closing the switch 14 is outputted, a storage battery discharge mode is kept during a predetermined time period (operation period Δt) until the switch 14 is expected to be actually closed, and when the predetermined time period has elapsed, the storage battery discharge mode is switched to a stand-alone output mode. The output voltage of the bidirectional inverter 12 and the voltage of the auxiliary input port P1 are matched with each other in voltage level and synchronized with each other in phase, whereby the voltage can be prevented from becoming discontinuous at the time of switching.

In addition, the control unit 19 outputs the signal for closing the switch 14 so that the timing at which the switch 14 having received the signal is actually closed coincides with a zero cross timing of the voltage phase, whereby a current that starts to flow through the switch 14 at the same time as the closing can be suppressed, and thus consumption of the relay contact can be suppressed.

Figure 4:
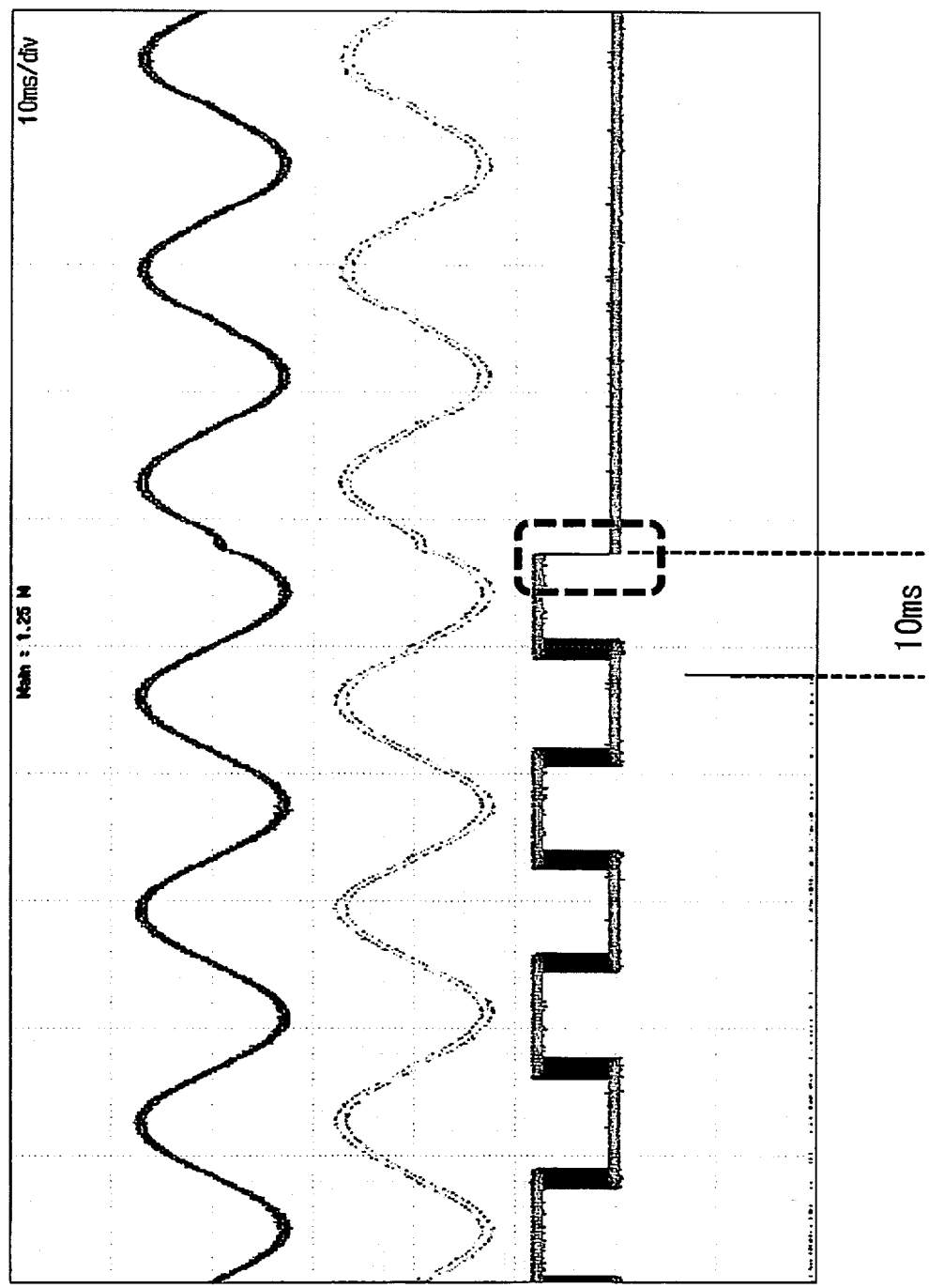
FIG. 4 is a first image of an oscilloscope in a case of observing waveforms at the time of switching in a state in which a resistance load of 1 kw is connected as a load for a specific-load distribution board.
Figure 5:
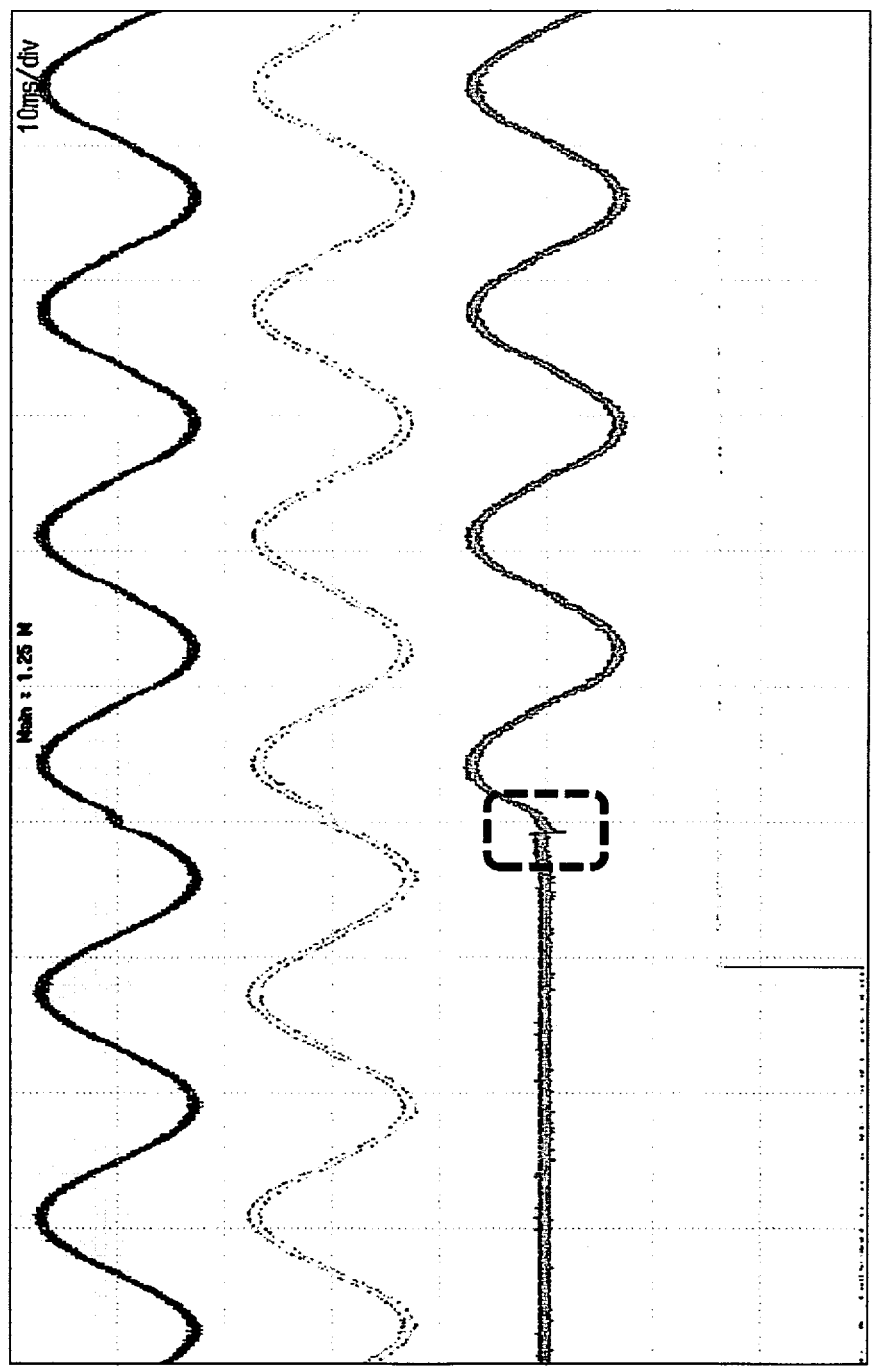
FIG. 5 is a second image of an oscilloscope in a case of observing waveforms at the time of switching in a state in which a resistance load of 1 kw is connected as a load for the specific-load distribution board.

FIG. 4 and FIG. 5 are images of an oscilloscope in a case of observing waveforms at the time of switching in a state in which a resistance load of 1 kw is connected as a load for the specific-load distribution board 5.

The waveforms in FIG. 4 are, from the upper side, the input voltage waveform of the stand-alone output, the waveform of an output voltage to the output terminal P3, and the gate voltage of the bidirectional inverter 12, and the lowermost one is a closing signal for the switch 14. As shown in FIG. 4, the input voltage waveform of the stand-alone output and the waveform of an output voltage to the output terminal P3 are matched with each other in voltage level and synchronized with each other in phase. The control unit 19 performs gate blocking 10 milliseconds after outputting the closing signal, thus stopping the bidirectional inverter 12. At this moment, the output voltage waveform is switched from output by discharging of the storage battery 11 to stand-alone output of the power conditioner 4, at or near a zero cross point.

The waveforms in FIG. 5 are, from the upper side, the input voltage waveform of the stand-alone output, the waveform of an output voltage to the output terminal P3, and the output current of the stand-alone output, and the lowermost one is a closing signal for the switch 14. As shown in FIG. 5, the input voltage waveform of the stand-alone output and the waveform of an output voltage to the output terminal P3 are matched with each other in voltage level and synchronized with each other in phase. About 10 milliseconds after the control unit 19 outputs the closing signal (part enclosed by dotted line in the graph), the relay contact of the switch 14 is closed, whereby a current starts to flow. Since the current starts to flow at or near a zero cross point of the voltage, an inrush current due to a cross-current (current flowing between the power conditioner 4 and the power supply device 10) does not occur.

<<Supplement>>

In the above embodiment, the configuration in which stand-alone output of the photovoltaic panel 3 is taken into the power supply device 10 has been shown. However, without limitation thereto, other than the photovoltaic panel 3, a distributed power supply having a power conditioner capable of stand-alone output, using natural energy, a fuel battery, or the like may be used.

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST 1 commercial power grid
2 general-load distribution board 3 photovoltaic panel
4 power conditioner
4t stand-alone output terminal
5 specific-load distribution board
10 power supply device
11 storage battery
12 bidirectional inverter (power conversion unit)
13, 14, 15 switch
16, 17, 18 voltage sensor
19 control unit
19p phase locked loop
20 current sensor
100 power supply system
C1, C2, C3 varistor
L1 power interconnection path
L2 stand-alone power supply path
L3 storage-battery-side power supply path
P1 power interconnection port
P2 auxiliary input port
P3 output port

The invention claimed is:

1. A power supply device comprising:
   a power interconnection port connected to a commercial power grid;
   an auxiliary input port connected to a stand-alone output terminal of a distributed power supply;
   an output port connected to a load;
   a storage battery;
   a power conversion unit connected to the storage battery and configured to perform charging/discharging of the storage battery through DC/AC bidirectional conversion;
   a power interconnection path connecting the power interconnection port to the power conversion unit via a first switch;
   a stand-alone power supply path leading from the auxiliary input port via a second switch to the output port;
   a storage-battery-side power supply path leading from the storage battery via the power conversion unit to the output port; and
   a control unit configured to,
      in a case of being interconnected with the commercial power grid, cause the power conversion unit to perform charging/discharging of the storage battery, and
      in a case of being disconnected from the commercial power grid, supply a power to the load via one of the stand-alone power supply path and the storage-battery-side power supply path, and in a state of being disconnected from the commercial power grid, when power supply to the load is to be switched between the stand-alone power supply path and the storage-battery-side power supply path, switch the power supply path within a time period that does not influence the load.

2. The power supply device according to claim 1, further comprising:
   an input voltage sensor configured to detect a voltage at the auxiliary input port and report the voltage to the control unit; and
   a conversion unit voltage sensor configured to detect a voltage at an AC-side end of the power conversion unit and report the voltage to the control unit, wherein
   both of the first switch and the second switch are relay contacts, and
   in shifting from a storage battery discharge mode in which a power is supplied to the load via the storage-battery-side power supply path to a stand-alone output mode in which a power is supplied to the load via the stand-alone power supply path, the control unit causes an output voltage of the power conversion unit and a voltage of the auxiliary input port to be matched with each other in voltage level and to be synchronized with each other in phase, and thereafter, outputs a signal for closing the second switch and keeps the storage battery discharge mode during a predetermined time period until the second switch is expected to be actually closed, and when the predetermined time period has elapsed, the control unit switches the storage battery discharge mode to the stand-alone output mode.

3. The power supply device according to claim 2, wherein the control unit outputs the signal for closing the second switch so that a timing at which the second switch having received the signal is actually closed is at or near a zero cross point of a voltage phase.

4. The power supply device according to claim 3, further comprising a current sensor configured to detect a current flowing through the output port and send a detection output thereof to the control unit, wherein
   the control unit charges the storage battery with a surplus power of stand-alone output of the distributed power supply on the basis of the detection output of the current sensor in the stand-alone output mode.

5. The power supply device according to claim 2, further comprising a current sensor configured to detect a current flowing through the output port and send a detection output thereof to the control unit, wherein
   the control unit charges the storage battery with a surplus power of stand-alone output of the distributed power supply on the basis of the detection output of the current sensor in the stand-alone output mode.

6. A power supply system comprising:
   a photovoltaic panel;
   a power conditioner connected to the photovoltaic panel, and having a function of performing power interconnection with a commercial power grid and a function of providing stand-alone output; and
   a power supply device having a storage battery, wherein the power supply device includes:
   a power interconnection port connected to the commercial power grid;
   an auxiliary input port connected to a stand-alone output terminal of the power conditioner;
   an output port connected to a load;
   a power conversion unit connected to the storage battery and configured to perform charging/discharging of the storage battery through DC/AC bidirectional conversion;
   a power interconnection path connecting the power interconnection port to the power conversion unit via a first switch;
   a stand-alone power supply path leading from the auxiliary input port via a second switch to the output port;
   a storage-battery-side power supply path leading from the storage battery via the power conversion unit to the output port; and
   a control unit configured to,
      in a case of being interconnected with the commercial power grid, cause the power conversion unit to perform charging/discharging of the storage battery, and
      in a case of being disconnected from the commercial power grid, supply a power to the load via one of the stand-alone power supply path and the storage-battery-side power supply path, and in a state of being disconnected from the commercial power grid, when power supply to the load is to be switched between the stand-alone power supply path and the storage-battery-side power supply path, switch the power supply path within a time period that does not influence the load.

7. A power supply device comprising:
a power interconnection port connected to a commercial power grid;
an auxiliary input port connected to a stand-alone output terminal of a distributed power supply;
an output port connected to a load;
a storage battery;
a power conversion unit connected to the storage battery and configured to perform charging/discharging of the storage battery through DC/AC bidirectional conversion;
a power interconnection path connecting the power interconnection port to the power conversion unit via a first switch;
a stand-alone power supply path leading from the auxiliary input port via a second switch to the output port;
a storage-battery-side power supply path leading from the storage battery via the power conversion unit to the output port; and
a control unit configured to control the power conversion unit, and the first switch and the second switch, wherein
in a case of interconnecting with the commercial power grid, the control unit closes the first switch and opens the second switch, and causes the power conversion unit to perform charging/discharging of the storage battery,
in a case of performing disconnection from the commercial power grid, the control unit stands by during a predetermined time period in a state in which the first switch is opened and the second switch is also opened, and thereafter, supplies a power to the load via one of the stand-alone power supply path and the storage-battery-side power supply path, and
in a state of being disconnected from the commercial power grid, when power supply to the load is to be switched between the stand-alone power supply path and the storage-battery-side power supply path, the control unit performs the switching substantially without power interruption.

* * * * *